(12) United States Patent
Löx

(10) Patent No.: US 6,170,626 B1
(45) Date of Patent: Jan. 9, 2001

(54) CLAMPING ROLLER OVERRUNNING CLUTCH AND METHOD OF MAKING SAME

(75) Inventor: Otmar Löx, Fürth (DE)

(73) Assignee: INA Walzlager Schaeffler oHG (DE)

( * ) Notice: Under 35 U.S.C. 154(b), the term of this patent shall be extended for 0 days.

(21) Appl. No.: 09/110,666

(22) Filed: Jul. 6, 1998

(30) Foreign Application Priority Data

Jul. 31, 1997 (DE) ............................................. 197 33 026

(51) Int. Cl.⁷ ................................................ F16D 41/067
(52) U.S. Cl. ................................................ 192/45; 29/446
(58) Field of Search ................................... 192/45; 188/82, 188/84; 29/428, 446; 267/158, 160

(56) References Cited

U.S. PATENT DOCUMENTS

| | | | |
|---|---|---|---|
| 1,798,526 | * 3/1931 | Fitzgerald | ................................. 29/446 |
| 2,835,364 | 5/1958 | Picard et al. | . |
| 3,192,551 | * 7/1965 | Appel | ................................. 267/158 X |
| 3,404,760 | 10/1968 | Benson et al. | . |
| 3,500,977 | * 3/1970 | Gehrke | .................................... 192/45 |
| 4,549,638 | 10/1985 | Johnston | . |
| 4,711,330 | 12/1987 | Lederman | . |
| 4,834,227 | * 5/1989 | Lederman | ................................. 192/45 |
| 5,007,514 | * 4/1991 | Hattori et al. | .......................... 192/45 |

FOREIGN PATENT DOCUMENTS

| | | |
|---|---|---|
| 1286843 | 1/1969 | (DE) . |
| 9090147 | 10/1991 | (DE) . |
| 4216055 | 11/1993 | (DE) . |

OTHER PUBLICATIONS

Hideo Mibe, "One Way Clutch and its Manufacture" Patent Abstracts of Japan, JP 4–191536, M–1330, Oct. 26, 1992, vol. 16, No. 519.

* cited by examiner

Primary Examiner—Richard M. Lorence
(74) Attorney, Agent, or Firm—Bierman, Muserlian and Lucas

(57) ABSTRACT

A clamping roller overrunning clutch, each of whose clamping rollers (4) is urged against clamping tracks (5) by at least one arc-shaped spring element, preferably a leaf spring (6), whose arc ends (11) are suspended against the clamping rollers (4) whereby a proper spring loading of the clamping rollers (4) is assured by the fact that a support surface (10) for the arc-shaped spring element (6) extending between the arc ends (11) is made so that a support contact (A, A', A") between the support surface (10) and the arc-shaped spring element (6) migrates toward the arc ends (11) of the arc-shaped spring element (6) with increasing load and a method of making the said clutch.

8 Claims, 3 Drawing Sheets ll
CLAMPING ROLLER OVERRUNNING CLUTCH AND METHOD OF MAKING SAME

FIELD OF THE INVENTION

A clamping roller overrunning clutch, each of whose clamping rollers is urged against clamping tracks by at least one spring element. The clamping rollers of such overrunning clutches are normally urged by spring elements into wedge-shaped gaps formed by the clamping tracks, one of which clamping tracks has a ramp-shaped contour and this spring-loading creates the constant locking readiness of the clamping roller overrunning clutch.

BACKGROUND OF THE INVENTION

In a clamping roller overrunning clutch known, for example, from GB-B 1,125,636, the spring means is a leaf spring bent in the form of an arc whose ends spring load the rollers. In the axial direction, the leaf spring is supported centrally on a crossbar and this means that this leaf spring is subjected to the maximum bending load in its central support contact. It has been observed in such spring arrangements that a strong setting of the spring elements takes place during operation which means that the spring force or the residual spring travel available until the block state of the spring is reached is no longer adequate for assuring a satisfactory spring loading of the clamping rollers. In such cases, a malfunctioning of the overrunning clutch can occur which is undesirable under all circumstances.

Residual spring travel designates the travel of the spring which remains after the setting of the spring from an unloaded starting position until the reaching of the block state. Due to the high dynamic bending load (the lever arm of the force between the point of force application and the point of support in the support contact is approximately half the leaf spring length), breaking of such spring elements has also been observed.

OBJECTS OF THE INVENTION

It is an object of the invention to provide a clamping roller overrunning clutch in which a reliable spring loading of the clamping rollers into the clamping gaps is assured.

This and other objects and advantages of the invention will become obvious from the following detailed description.

SUMMARY OF THE INVENTION

The clamping roller overrunning clutch of the invention each of whose clamping rollers (4) is urged against clamping tracks (5) by at least one arc-shaped spring element, whose arc ends (11) are suspended against the clamping rollers (4), is characterized in that a support surface (10) for the arc-shaped spring element extending between the arc ends (11) is made so that a support contact (A, A', A") between the support surface (10) and the arc-shaped spring element (6) migrates towards the arc ends (11) of the arc-shaped spring element (6) with increasing load. Firstly, the dynamic bending loading of the spring elements of the clamping roller overrunning clutch of the invention is lower than in the case of the aforementioned known spring elements which is due to the fact that the lever arm between the point of application of the force and the point of support of the spring element in the support contact on the support surface shortens as the load increases because, as a result of loading, the spring element comes to lie against the support surface. This necessarily results in a lowering of the bending moment and thus also of the bending load.

Advantageously, the arc-shaped leaf spring and the support surface are designed so that the elastic limit of the arc-shaped leaf spring is exceeded during the first load cycles to which the overrunning clutch is subjected so that a larger material cross-section sets than in known arrangements. Thus, in the ideal case, the entire cross-section of the spring is loaded up to the yield point in the region of maximum deflection and a setting of the spring during operation of the overrunning clutch is only minimal. In this way, it is assured that the residual spring travel available is larger than in conventional devices.

With a view to the spring setting process, the invention proposes a flat support surface which extends tangentially of the axial center of the unloaded arc-shaped spring element. It is, of course, also possible to use curved support surfaces. The only important thing is that the arc-shaped spring element comes to bear against the support surface with increasing load in the manner described above. Arc-shaped spring elements with a constant curvature are particularly easy to manufacture. It is understood that the advantages of the invention can also be assured with arc-shaped spring elements having a non-uniform curvature.

Clamping roller overrunning clutches having a cage for receiving the clamping rollers can be used particularly favorably for fixing the arc-shaped elements of the invention. Normally, the clamping rollers are arranged in pockets of the cage which are circumferentially defined by crossbars of the cage. The arc-shaped spring elements of the invention are fixed on the crossbars, for example by clipping them onto the crossbars, or by forming them integrally on the crossbars. A surface of the crossbar defining the pocket can be simultaneously used as a support surface for the arc-shaped spring element.

The clamping roller overrunning clutch of the invention can be made by the following steps. In a first step, the curved spring elements are inserted into the overrunning clutch. The clamping rollers and the spring elements are then pressed against one another, preferably during the first load cycles in operation leading to the desired setting of the springs. However, it is also possible to perform this pressing step using suitable equipment before taking the clamping roller overrunning clutch into operation. The loading of the spring elements in this pressing step is performed above the yield point but below the breaking point of the spring material. This loading results in a setting of the spring elements.

While in prior art clamping roller overrunning clutches a setting of the spring elements is rather unintended and occurs during operation with the initially described disadvantages, the method of the invention guarantees a perfect operation of the clamping roller overrunning clutch because the setting of the spring elements is effected in a controlled manner during the first load cycles and, after this intended setting, a minimum spring loading of the clamping rollers by the spring elements is assured. Prior to insertion into the clamping roller overrunning clutch, the spring elements are configured with a curvature and an arc length which are chosen so that, on insertion into the clamping roller overrunning clutch, the spring loading of the clamping rollers by the spring elements is at first higher. After completion of the intended setting process, the spring load reduces but is still adapted to the operating conditions.

The method of the invention is not limited to the examples of embodiment described herein. The determining factor is only that the shape and size of the spring elements should permit the use of the described method which assures that an unintended setting of the springs during the operating life is replaced by an intended setting which is substantially completed at the beginning of initial operation of the overrunning clutch.

BRIEF DESCRIPTION OF THE DRAWINGS

The invention will now be described more closely with reference to the eight appended figures illustrating an embodiment of the invention and a prior art device for the purpose of comparison.

DETAILED DESCRIPTION OF THE DRAWINGS

Figure 1:
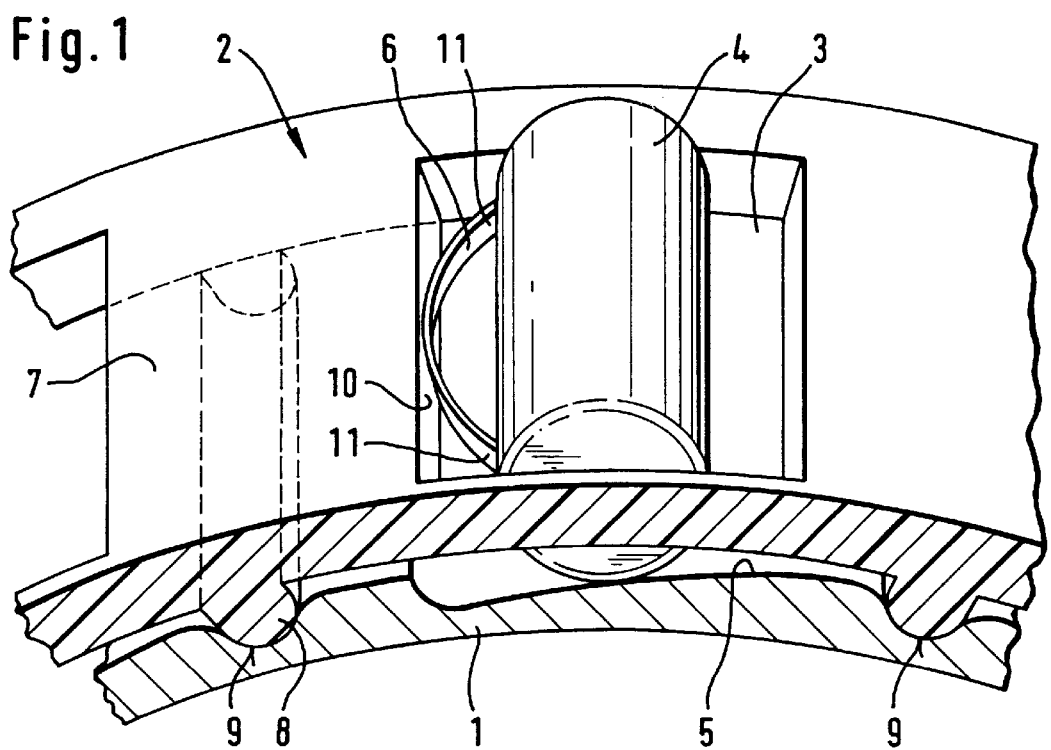
FIG. 1 is a fragmentary perspective view of a clamping roller overrunning clutch of the invention.

The clamping roller overrunning clutch of the invention shown in FIG. 1 comprises an inner machine element 1, an outer machine element, not shown for the sake of clearness, and a cage 2 arranged between the inner and the outer machine element. Clamping rollers 4 are arranged in pockets 3 defined by the cage 2. The clamping rollers 4 are spring loaded against clamping ramps 5 formed on the inner machine element 1 and against a cylindrical clamping track defined by the outer machine element, not represented, by arc-shaped leaf springs 6 which are supported on crossbars 7 of the cage 2 which define the pockets 3. The crossbars 7 are provided with lugs 8 which engage grooves 9 of the inner machine element 1 to effect a rotationally fast connection between the cage 2 and the inner machine element 1. A surface of the crossbar 7 delimiting the pocket 3 forms a support surface 10 for the leaf spring 6 which is suspended with its arc ends 11 against the clamping roller 4. The leaf spring 6 is supported at its axial center on a support point A on the support surface 10.

Figure 2:
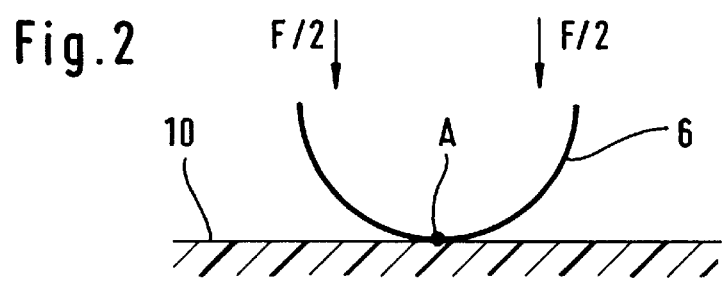
FIG. 2 is a schematic representation of the unloaded spring element.
Figure 3:
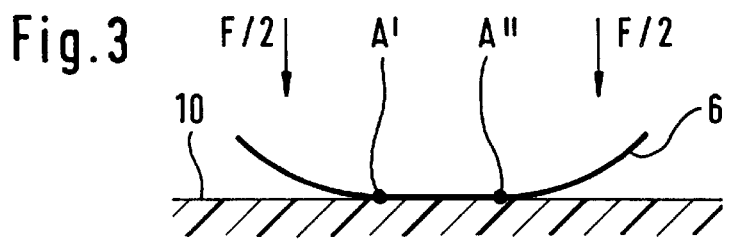
FIG. 3 is a schematic representation of the loaded spring element.

FIG. 2 is a schematic representation of the unloaded arc-shaped leaf spring 6 supported at the support point A on the support surface 10. Under load, as shown in FIG. 3, the arc-shaped leaf spring 6 comes to bear more closely against the support surface 10 as the load increases, and the points of contact A' and A" between the support surface 10 and the leaf spring 6 migrate towards the ends of the arc-shaped leaf spring 6. In this way, the lever arms between the points of force application and the support contact A' and A" respectively, which determine the bending load, are shortened.

The leaf spring 6 is dimensioned so that it sets after a number of load cycles in which the yield point is exceeded with the result that a larger material cross-section sets. In the ideal case, the entire spring cross-section is loaded up to the yield point in the region of maximum deflection and a setting of the spring during operation is minimal. After completion of the setting process, the support contacts A' and A" are maintained with the effect that the lever arms determining the bending load are shortened. The reduction of the dynamic bending load thus effected increases the safety against fatigue fracture. Having regard to the setting process, the arc-shaped leaf spring 6 is designed so that a sufficient spring load for loading the clamping rollers still exists.

Figure 4:
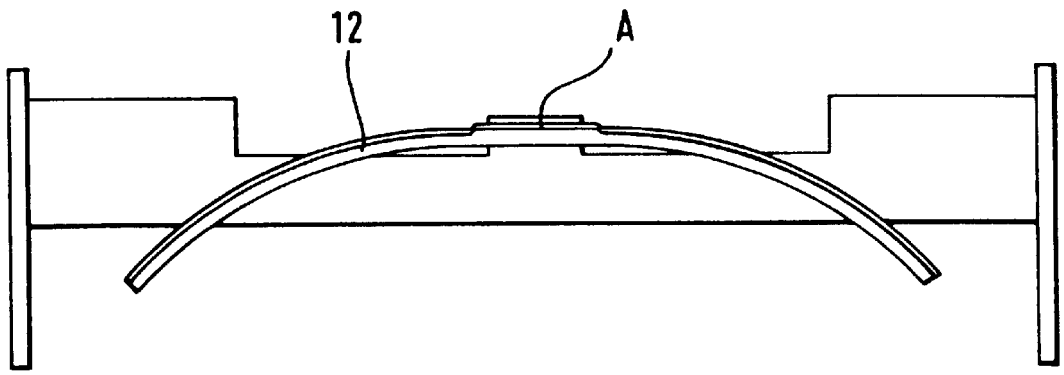
FIG. 4 shows a spring arrangement of a prior art device.
Figure 5:
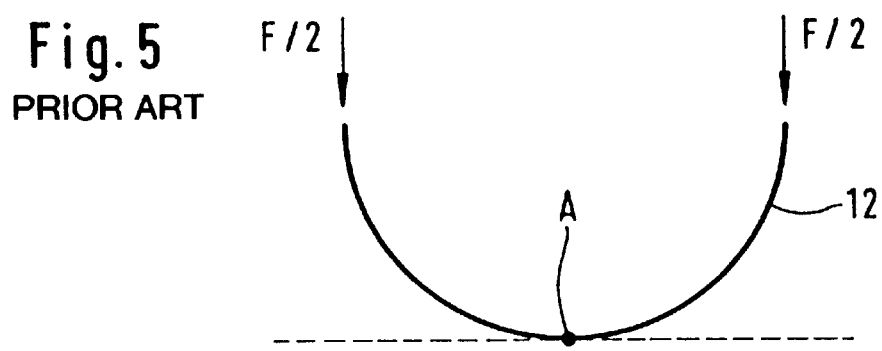
FIG. 5 is a schematic representation of the unloaded prior art leaf spring.
Figure 6:
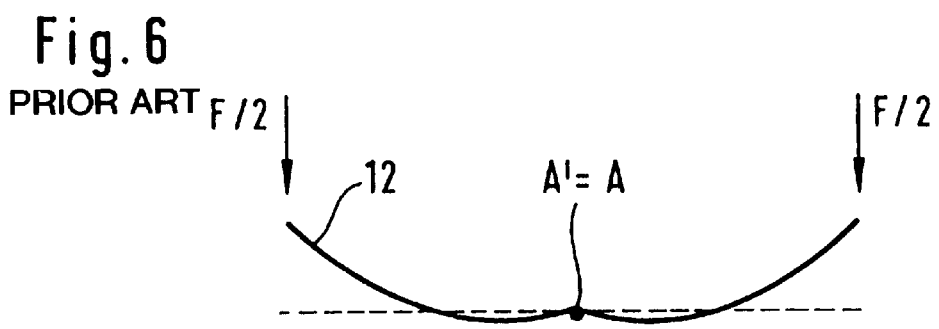
FIG. 6 is a schematic representation of the loaded prior art leaf spring.

FIG. 4 shows a prior art leaf-type spring element such as often used in clamping roller overrunning clutches. It can be seen from the drawing that the leaf spring 12 has only one support contact A, and FIGS. 5 and 6 show that this support contact constitutes the only support contact A, both in the unloaded and in the loaded condition of the leaf spring 12 and further, that the support contact A is not displaced towards the ends of the arc-shaped spring 12 when this is loaded. The broken line marks the position of the support surface in the clamping roller overrunning clutch of the invention shown in FIG. 1. As can be seen particularly in FIG. 6, there exists a maximum lever arm between the support contact A and the point of force application and thus there is a danger of a fatigue fracture at this support contact A due to high bending load.

Figure 7:
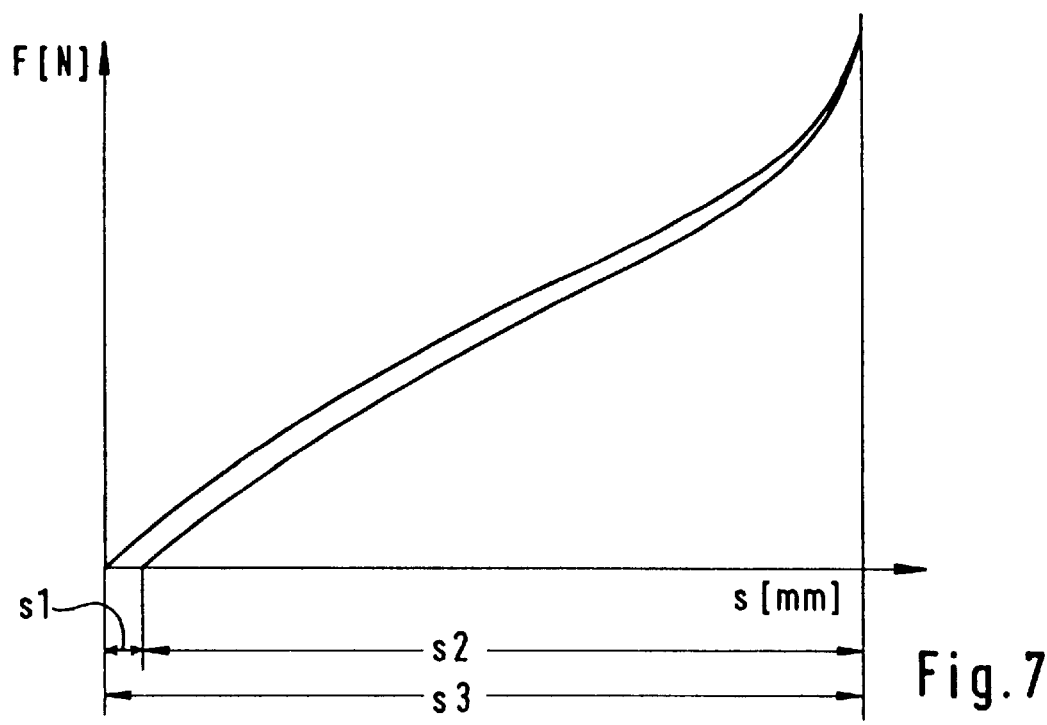
FIG. 7 shows the spring characteristic of the spring element of the invention.
Figure 8:
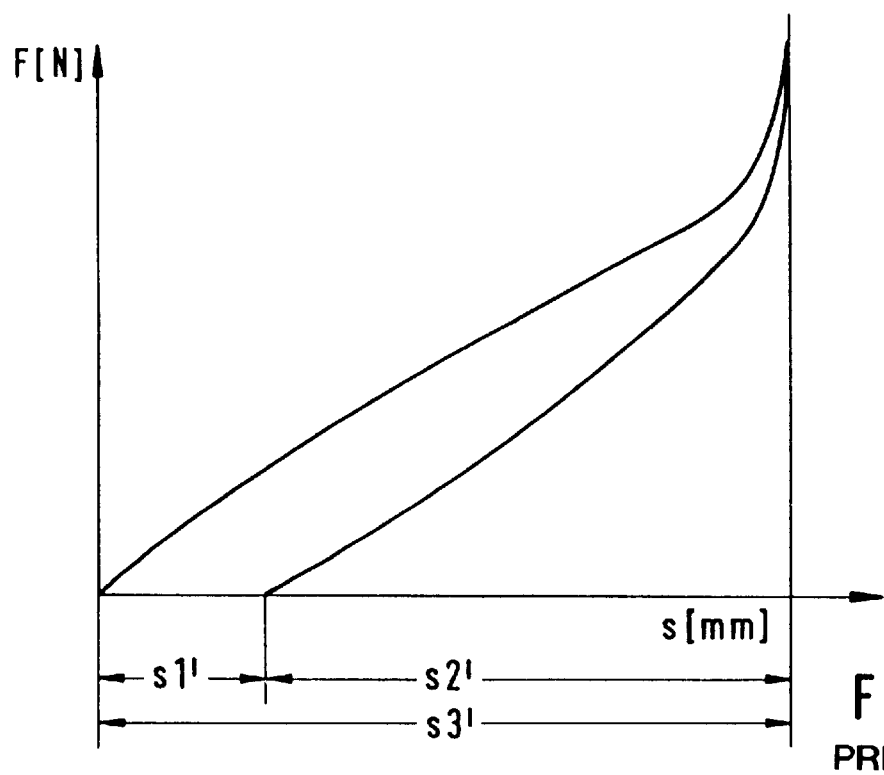
FIG. 8 shows the spring characteristic of the prior art spring element.

The difference between the spring element of the invention and that of the prior art also becomes clear by a comparison their spring characteristics. FIG. 7 shows the spring characteristic of a spring element of the invention, sl being the spring setting travel, s2 the residual spring travel until reaching of the block state and s3 the total spring travel from initial loading until reaching of the block state. A comparison of the spring setting travel sl of the invention with the corresponding spring setting travel s1' of the prior art spring element shown in FIG. 8 clearly shows that s1' is substantially larger than sl so that the residual spring travel s2 of the invention is clearly larger than the residual spring travel s2' of the prior art spring.

The reason for the notably shorter spring setting travel of the spring arrangement of the invention is the shorter lever arm between the point of force application and the point of support of the loaded leaf spring on the contact surface. It is true that due to the shorter lever arm, the yield point is intentionally exceeded but this advantageously assures that, already during the first loading cycles of the clamping roller overrunning clutch, a larger material cross-section of the leaf spring sets than in known spring arrangements and thus a further setting of the spring does not take place.

Various modifications of the overrunning clutch of the invention may be made without departing from the spirit or scope thereof. It is to be understood that the invention is intended to be limited only as defined in the appended claims.

What I claim is:

1. A clamping roller overrunning clutch, each of whose clamping rollers (4) is urged against clamping tracks (5) by at least one arc-shaped spring element, whose arc ends (11) are suspended against the clamping rollers (4), characterized in that a support surface (10) for the arc-shaped spring element extending between the arc ends (11) is made so that a support contact (A, A', A") between the support surface (10) and the arc-shaped spring element (6) migrates towards the arc ends (11) of the arc-shaped spring element (6) with increasing load.

2. The clamping roller overrunning clutch of claim 1 wherein the spring element is a leaf spring (6).

3. A clamping roller overrunning clutch of claim 1 wherein the support surface is a flat surface (10) which extends tangentially of an axial center of the arc-shaped spring element (6) in an unloaded state thereof.

4. A clamping roller overrunning clutch of claim 1 wherein the arc-shaped spring element has an almost constant curvature in an unloaded state.

5. A clamping roller overrunning clutch of claim 2 comprising a cage (2) having pockets (3) in which the clamping rollers (4) are arranged, the pockets (3) being circumferentially defined by crossbars (7) of the cage (2) wherein the arc-shaped spring elements (6) are fixed on the crossbars (7) by being clipped onto the crossbars (7) or by being formed integrally thereon.

6. A clamping roller overrunning clutch of claim 5 wherein a surface of the crossbar (7) defining the pocket (3) forms the support surface (10) for the arc-shaped spring element (6).

7. A method of making a clamping roller overrunning clutch, each of whose clamping rollers (4) is urged against clamping tracks (5) by at least one arc-shaped spring element, whose arc ends (11) are suspended against the clamping rollers (4), said method comprising the steps of inserting the arc-shaped curved spring elements into the clamping roller overrunning clutch, loading the spring elements by pressing together the spring elements and the clamping rollers (4), said loading being performed above the yield point but below the breaking point of the spring material so that a setting of the spring elements takes place as a result of said loading, and after completion of said setting, a minimum loading of the clamping rollers (4) by the spring elements required for a proper operation of the clamping roller overrunning clutch is guaranteed.

8. The method of claim 8 wherein the spring element is a leaf spring (6).

* * * * *